United States Patent
Baumann et al.

(10) Patent No.: US 8,707,790 B2
(45) Date of Patent: Apr. 29, 2014

(54) METHOD AND DEVICE FOR OPTICAL PRESSURE MEASUREMENT OF A GAS IN A CLOSED CONTAINER

(75) Inventors: Bernd Baumann, Hamburg (DE); Marcus Wolff, Hamburg (DE)

(73) Assignee: Heuft Systemtechnik GmbH, Burgbrohl (DE)

( * ) Notice: Subject to any disclaimer, the term of this patent is extended or adjusted under 35 U.S.C. 154(b) by 147 days.

(21) Appl. No.: 13/322,043

(22) PCT Filed: May 20, 2010

(86) PCT No.: PCT/EP2010/003113
§ 371 (c)(1),
(2), (4) Date: Jan. 31, 2012

(87) PCT Pub. No.: WO2010/136154
PCT Pub. Date: Dec. 2, 2010

(65) Prior Publication Data
US 2012/0266681 A1    Oct. 25, 2012

(30) Foreign Application Priority Data

May 23, 2009  (DE) .................. 10 2009 022 465

(51) Int. Cl.
*G01L 9/00* (2006.01)
(52) U.S. Cl.
USPC .......................................... 73/705; 73/23.27
(58) Field of Classification Search
None
See application file for complete search history.

(56) References Cited

U.S. PATENT DOCUMENTS

| | | | |
|---|---|---|---|
| 5,130,544 A * | 7/1992 | Nilsson | 250/343 |
| 5,473,161 A | 12/1995 | Nix et al. | |
| 5,614,718 A | 3/1997 | Brace | |
| 5,912,457 A | 6/1999 | McQuaid | |
| 6,874,351 B2 | 4/2005 | Bloder et al. | |
| 2001/0019408 A1* | 9/2001 | Hagler | 356/310 |
| 2004/0223150 A1* | 11/2004 | Hagler | 356/304 |
| 2005/0022603 A1 | 2/2005 | Lehmann et al. | |
| 2013/0221224 A1* | 8/2013 | Maksyutenko et al. | 250/343 |
| 2013/0248736 A1* | 9/2013 | Tkachuk | 250/458.1 |

FOREIGN PATENT DOCUMENTS

| | | |
|---|---|---|
| AT | 409 673 B | 10/2002 |
| DE | 27 27 976 A1 | 6/1977 |
| DE | 10 2006 001 902 A1 | 1/2006 |
| DE | 10 2006 030 296 A1 | 1/2008 |
| DE | 10 2007 027 708 A1 | 12/2008 |
| EP | 1 450 139 A2 | 8/2004 |
| EP | 1 808 683 A2 | 7/2007 |
| GB | 2373584 A | 9/2002 |
| JP | 62 156543 A | 7/1987 |
| JP | 2006030161 A | 2/2006 |
| WO | 2008/053507 A2 | 5/2008 |
| WO | 2009/006944 A1 | 1/2009 |

\* cited by examiner

*Primary Examiner* — Andre Allen
(74) *Attorney, Agent, or Firm* — Vidas, Arrett & Steinkraus, P.A.

(57) ABSTRACT

Method for optical pressure measurement of a gas in a closed container by directing a radiation of a radiator through the container and measuring the transmitted radiation by a detector, wherein the radiation of the radiator covers at least one first wavelength range in which there is an absorption of the radiation by the gas, the intensity of the transmitted radiation is detected in a second wavelength range by the detector, wherein the second wavelength range overlaps at least partially with the first wavelength range, and an accumulated intensity of the detected radiation in the second wavelength range is assigned to a pressure of the gas.

23 Claims, 6 Drawing Sheets

Method for optical pressure measurement
Figure 1

Method for optical pressure measurement
Figure 2

Method for optical pressure measurement
Figure 2a

Method for optical pressure measurement
Figure 3

Method for optical pressure measurement
Figure 4

METHOD AND DEVICE FOR OPTICAL PRESSURE MEASUREMENT OF A GAS IN A CLOSED CONTAINER

CROSS-REFERENCE TO RELATED APPLICATIONS

Not applicable.

STATEMENT REGARDING FEDERALLY SPONSORED RESEARCH

Not applicable.

BACKGROUND OF THE INVENTION

The present invention relates to a method and a device for optical pressure measurement of a gas in a closed container.

For the measurement of the pressure in beverage bottles, methods based on repeated volume expansion are known (AT 409 673, GB 2,373,584, U.S. Pat. No. 6,874,351). These methods permit only random sampling measurements, because the beverage has to be filled into an extra measurement chamber. Even the pressure sensors placed into the bottles, known from DE 10 2007 027 708 A1 for instance, do not permit online/inline measurement. From DE 10 2006 001 902 B4, DE 10 2006 030 296 A1 and JP 00 2006 030 161 AA, methods in which the absorption line of the enclosed gas is measured with the aid of a laser are known for optical pressure measurement in the closed container. For this purpose, it must be ensured that the laser emits a longitudinal mode only, which is spectrally tunable in a reproducible manner besides to this. This is permitted exclusively by expensive lasers. Moreover, very precise control of the operating current and the operating temperature of the laser is necessary for this, which further increases the expenditure. The exact measurement of an absorption line takes so much time that these methods are not suitable for automatization. Because absorption lines widen up so strongly at high pressures that they melt together with the neighbouring lines, as will be outlined in more detail below, the lines will become indistinguishable upon increasing pressure, and the precision of measurement decreases. From on a certain pressure, the lines will become indistinguishable. Thus, the method has only a limited measurement range and is intended for low pressures.

From EP 1 450 139, a method is known to measure the entire flow of air masses through a combustion engine. For this purpose, the concentration of carbon dioxide is determined by detecting the infrared spectrum. For analysis, the measured carbon dioxide absorption spectrum is compared with a multitude of mathematically simulated carbon dioxide absorption spectra in order to find a coincidence. The mathematically simulated carbon dioxide absorption spectra correspond to different temperatures and different concentrations of the carbon dioxide.

From US 2005/0022603 A1, a method is known to measure the pressure in a closed container. In this method, the wavelength of a laser is periodically modulated in a wavelength range which comprises at least one absorption line of the gas to be examined. The electric output signals developing through the periodically modulated wavelength are subsequently subject to frequency filtering by a bandpass filter or a filter having a cutoff frequency. The filtered signals are then analysed in view of the pressure of the gas.

BRIEF SUMMARY OF THE INVENTION

The present invention is based on the objective to provide a method for optical pressure measurement of a gas in a closed container which is as simple and robust as possible, as well as a device for performing the method, which are also suited for industrial utilisation.

In the method of the present invention, a radiation of a radiator is directed through the container, and the transmitted radiation is measured in a detector. According to the present invention, the radiation of the radiator has at least one first wavelength range, in which there is an absorption of the radiation by the gas. Thus, the radiator radiates in a wavelength spectrum which has at least one absorption line of the gas to be measured. A detector detects the intensity of the transmitted radiation in a second wavelength range. The second wavelength range is selected such that it overlaps at least partially with the first wavelength range of the radiator. According to the invention, an accumulated intensity of the radiation detected in the second wavelength range is assigned to a pressure of the gas. Preferably, the allocation takes place via a characteristic curve, which indicates a pressure value depending on the accumulated intensity of the detected radiation.

In difference to the methods known in the state of the art, in the method of the present invention there is no spectral analysis wherein a spectrally tunable laser is used in order to detect the position of the absorption line as accurately as possible. The method of the present invention is based on the finding that also the accumulated intensity of the detected radiation in the second wavelength range is a very accurate indicator for the pressure of the gas to be measured. This finding permits to provide a particularly simple and robust measurement method, wherein the radiator radiates in a first wavelength range, and the detector detects an accumulated intensity of the transmitted radiation.

In a preferred embodiment, the directing of the radiation through the gas takes place in the gas phase. Alternatively, it is also possible to direct the radiation through the liquid phase in order to measure the pressure of the dissolved gas.

In the method of the present invention, the radiator radiates with a continuous spectrum in the first wavelength range. In difference to solutions of the state of the art, which work with laser light, a radiator with a continuous spectrum can be used in the method of the present invention. This has the particular advantaged that modulating the wavelengths can be omitted.

In a preferred embodiment, a thermal radiator is provided as radiator, whose radiated spectrum corresponds to a Planck spectrum. Such radiators are particularly robust and can be adjusted to the desired first wavelength range by adjusting their temperature.

In an alternative embodiment, it is intended to use at least one light emitting diode as radiator. The light emitting diode emits radiation in a more narrow wavelength range than the Planck radiator mentioned above. However, at present robust light emitting diodes are available which radiate in a sufficiently wide spectrum which can be regarded as continuous in a wavelength range.

In a further embodiment, it is also possible to use a laser, a semiconductor laser in particular, whose wavelength can be modulated in a first wavelength range. Contrary to the state of the art, the requirements for the modulation of the wavelengths in view of reproducibility, temperature stability and accurateness of the wavelength, are not as high in the method of the present invention as for the methods of the state of the art, in which the exact value of the wavelength must be precisely reproducible for the modulation of the wavelength.

In a particularly preferred embodiment, the second wavelength range of the detector in which the accumulated intensity is determined, comprises also the wavelength range in which there is an absorption of the radiation by the gas. It has proven that the pressure values determined according to the present invention are particularly reliable when the wavelengths that contribute to the accumulated value for the intensity are within the absorption spectrum.

In one possible embodiment, it may be intended to limit the radiation from the first wavelength range of the radiator to the second wavelength range by one or several filters. The detector detects the radiation in the second wavelength range and determines the accumulated intensity from the same.

In order to determine the accumulated intensity, a simple electric sensor is preferably used, which converts the entire incident radiation into an electric signal, and thus determines its accumulated intensity. Alternatively to using an electric sensor, like a photodiode for instance, it is in principle also possible to determine the accumulated intensity in the second wavelength range by summing up or integrating the intensity over the wavelength.

In a preferred embodiment of the method according to the present invention, the allocation of the values for the accumulated intensity to the pressure value of the gas takes place via a characteristic curve. By way of a predetermined characteristic curve, a pressure value can be assigned to the accumulated intensity which corresponds to the pressure of the gas in the closed container.

The method of the present invention is particularly suitable for pressure measurement of carbon dioxide. As is well known, carbon dioxide has an absorption band for wavelengths between 1.9 µm and 2.1 µm, wherein the absorption is depending on pressure. But the method of the present invention is also suitable to be used for other gases in principle.

Three utilisations of the method are particularly advantageous, because the conditions of the surroundings require a robust method. The first preferred possibility of utilisation is to direct the radiation through a closed beverage bottle. By doing so, the pressure of carbon dioxide in the bottle can be measured. The measurement is fast and reliable, and it can be used also in the filling process of bottles.

A further utilisation is to check a protective gas filling. In food technology in particular, protective gas fillings are used to improve the shelf life of food. In this, there is the need to check whether the protective gas has been correctly filled in. By using the method of the present invention, the pressure of the filling with protective gas or of a component thereof, respectively, can be detected reliably, whereby the correct addition of the protective gas filling is ascertainable.

A further possibility to use the present invention is the examination of vacuum closed containers. Such containers are used in the food industry for instance. In vacuum packaging, it can be reliably confirmed with the aid of the method of the present invention that there is a low pressure in the container, so that there is a correct vacuum closure.

The device of the present invention consists of a radiator, a detector and an analysing unit. The radiator generates a radiation in a first wavelength range, wherein the first wavelength range is selected such that there is an absorption of the radiation by the gas. Thus, the gas has at least one absorption line in the first wavelength range. The detector detects the intensity of the radiation transmitted through the container and the gas in a second wavelength range, wherein the second wavelength range overlaps at least partially with the first wavelength range. The analysing unit assigns a pressure value to the accumulated intensity of the detected radiation in the second wavelength range. For technical reasons, the step of accumulation is preferably done by the detector, which detects the accumulated intensity of the radiation directly over the second wavelength range. The device of the present invention can be produced in a cost-saving way with simple components which are suitable for the utilisation in the industry.

A thermal radiator is preferably used, whose radiated spectrum corresponds to a Planck spectrum. Alternatively, it is also possible to provide one or several light emitting diodes having a continuous spectrum as radiator. A laser, a semiconductor laser in particular, can also be used.

In a preferred embodiment, the detector has within the second wavelength range several switchable measurement ranges, in which the pressure value can be determined for different pressure ranges of the gas. In an utilisation wherein it is necessary to measure over a great pressure range, it can be appropriate to provide on the detector switchable measurement ranges, which can be selected according to requirement.

The allocation of the accumulated intensity to the pressure value takes place in the analysing unit, expediently via a characteristic curve. A predetermined characteristic curve is deposed in the analysing unit for this purpose, which unambiguously assigns a pressure value of the gas to a value for the accumulated intensity.

Preferably, even several characteristic curves depending on the transmission spectrum of the container can be provided in the analysing unit, each providing the pressure value depending on the accumulated intensity. The utilisation of different characteristic curves makes allowance for the fact that the intensity of the accumulated radiation depends from the transmission spectrum of the container also.

BRIEF DESCRIPTION OF THE SEVERAL VIEWS OF THE DRAWINGS

The present invention will be explained in more detail by means of figures.

DETAILED DESCRIPTION OF THE INVENTION

While this invention may be embodied in many different forms, there are described in detail herein a specific preferred embodiment of the invention. This description is an exemplification of the principles of the invention and is not intended to limit the invention to the particular embodiment illustrated For better understanding of the present invention, the basic physical principles of the optical pressure measurement of gases will be outline at first:

The optical pressure measurement is based on the absorption of electromagnetic radiation by molecules according to the law of Lambert and Beer $$I_{Trans} = I_0 \exp(\alpha d)$$

wherein $I_{Trans}$ is the transmitted intensity, $I_0$ the radiated intensity, $\alpha$ the absorption coefficient and d the path length across the measurement volume. For the absorption coefficient depending on the frequency v we have:

$$\alpha(v)=\sigma(v)N,$$

wherein N is the number of the absorbing molecules per volume and σ(v) is the wavelength-depending absorption cross section. From the perfect gas law it follows that the molecule density ρ (number of particles per unit volume) at constant temperature T is proportional to the pressure p (κ: Boltzmann's constant):

$$\rho=p/(\kappa T).$$

Thus, when the transmission is measured at a certain wavelength, the pressure can be determined from this.

When a spectrally broad radiation source is used, like a thermal radiator or a light emitting diode LED e.g., absorption takes place not only at one absorption line, but on at least one absorption band, which consists of several absorption lines. Absorption lines are not infinitely sharp, but have a spectral profile. We have $$\sigma(v)=SG(v-v_0)$$

with the line strength S, the line shape function $G(v-v_0)$ and the frequency of the line centre $v_0$. At higher pressures (p>>100 hPa) it can be assumed that the line has a Lorentz profile:

$$G(v-v_0) = \frac{\Delta v/2\pi}{(v-v_0)^2 + (\Delta v/2)^2}.$$

The line width Δv is directly proportional to the pressure p in this:

$$\Delta v = \frac{\sqrt{8}\, a^2}{\sqrt{\pi m \kappa T}} p$$

wherein a is the molecule diameter and m the molecule mass. With increasing pressure, the absorption lines do not only become stronger, but even broader due to the increasing molecule density. When spectrally broad radiation sources are used, the transmission signal represents the integral of the transmission over the spectral emission range of the radiation source, convolved with the spectral sensitivity of the detector.

Figure 1:
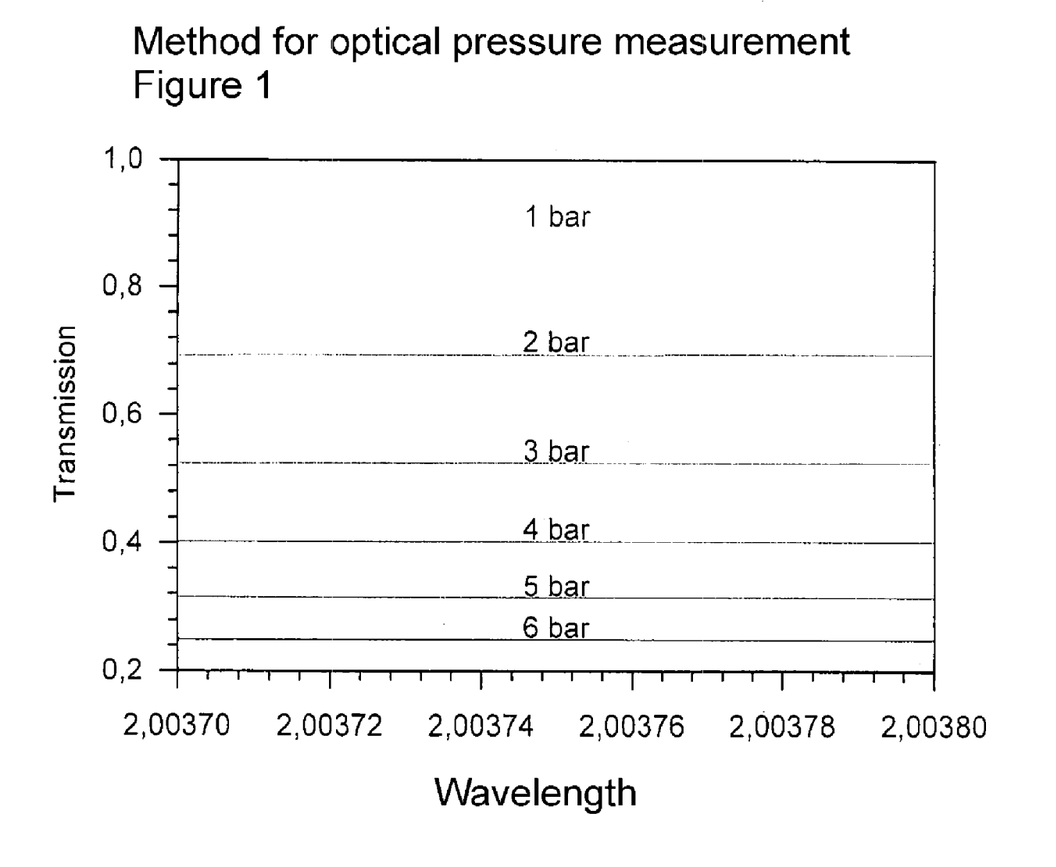
FIG. 1 shows the transmission through an absorption path filled with $CO_2$ as a function of the pressure in the wavelength range from 2.00370 µm to 2.00380 µm.

FIG. 1 shows a simple example, wherein the transmission is measured in a very narrow wavelength range. Here, one sees a clear dependence of the intensity on pressure for the narrow wavelength range.

Figure 2:
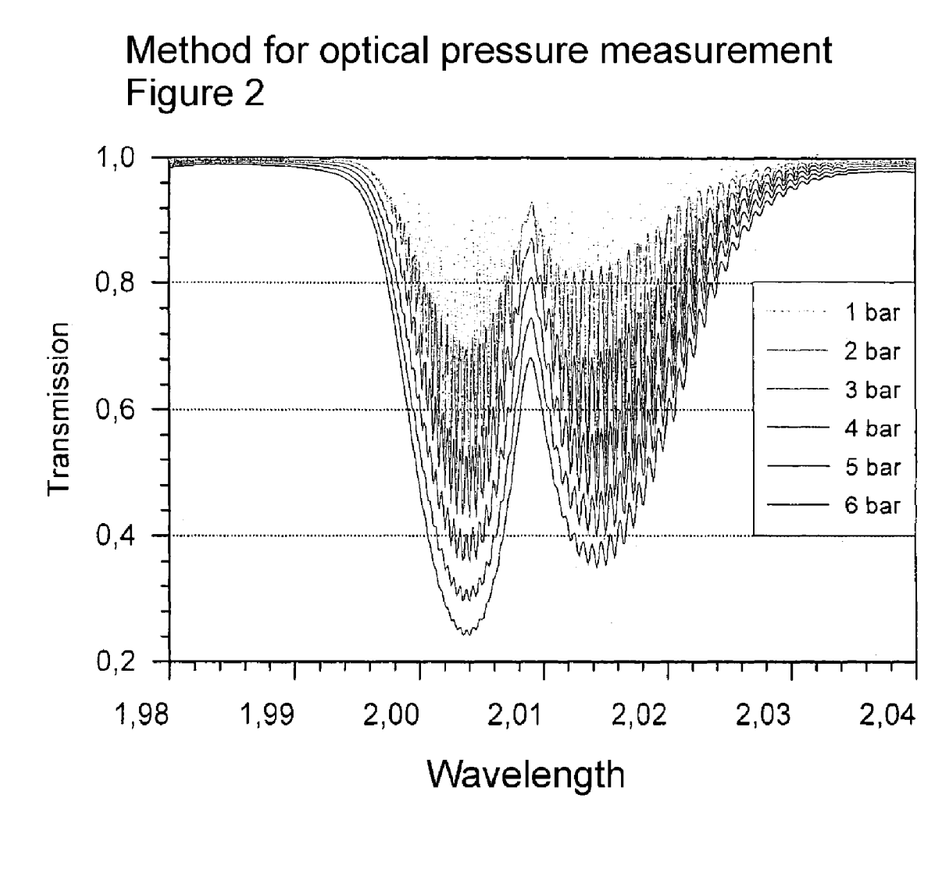
FIG. 2 shows the transmission through an absorption path filled with $CO_2$ as a function of the pressure in the wavelength range from 1.98 µm to 2.04 µm.

However, if one also wants to evaluate the pressure-dependent line broadening outlined at last, it will be helpful to measure over a greater wavelength range. FIG. 2 shows the transmission measured over the greater wavelength range, in an exemplary way. Depending on pressure, there is an approximately W-shaped transmission curve, which presents a fine wave structure in addition. FIG. 2 clarifies the two phenomena discussed above. On the one hand, one clearly recognises that the transmission curve continuously takes on smaller values when the pressure increases. It can also be recognised in FIG. 2 that the transmission curve becomes broader with increasing pressure.

On the other hand, FIG. 2 shows also clearly that the evaluation of the transmission value for exactly just one wavelength is very difficult, due to the superimposed fine wave structure. In addition, the exact position of this fine wave structure is depending on temperature, whereby the measurement is made even more difficult.

Figure 2A:
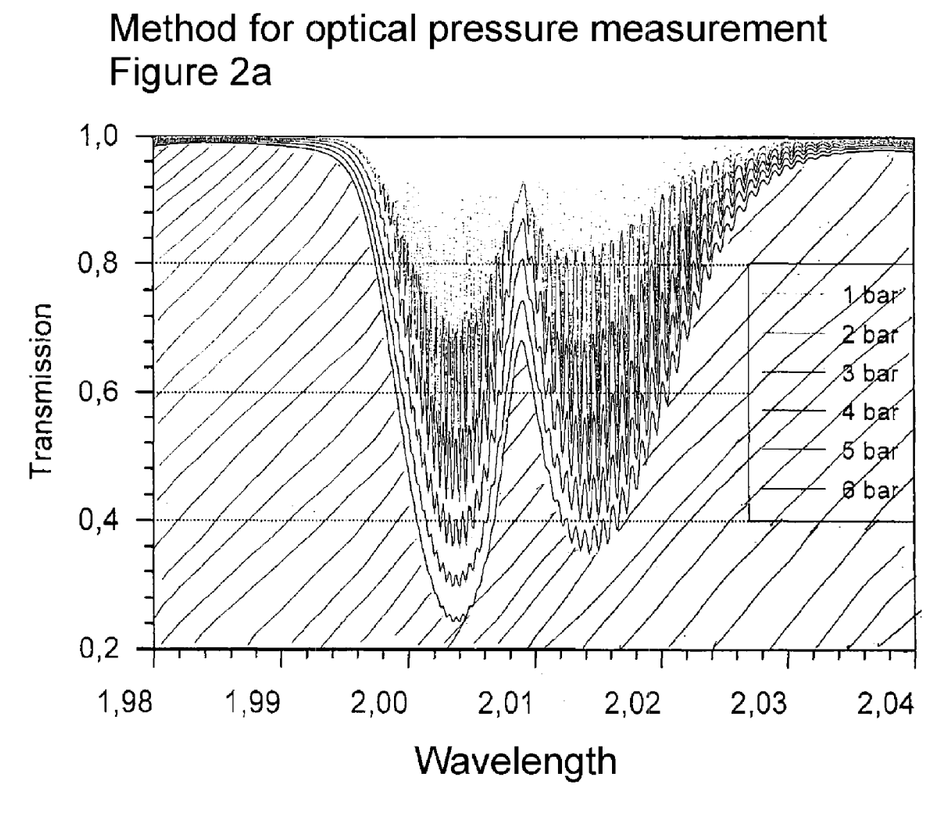
FIG. 2a shows the transmission spectrum according to FIG. 2, wherein the accumulated value of the intensity is highlighted.

In the method of the present invention, the accumulated intensity of the transmitted radiation is measured in order to determine the pressure. This corresponds to the shaded area in FIG. 2a. One clearly recognises that due to the accumulation of the intensity, the superimposed fine wave structure existing in the transmission curve does not have a decisive importance for the pressure value. In addition, the pressure can be detected particularly precisely just through the interplay of the two effects.

Figure 5:
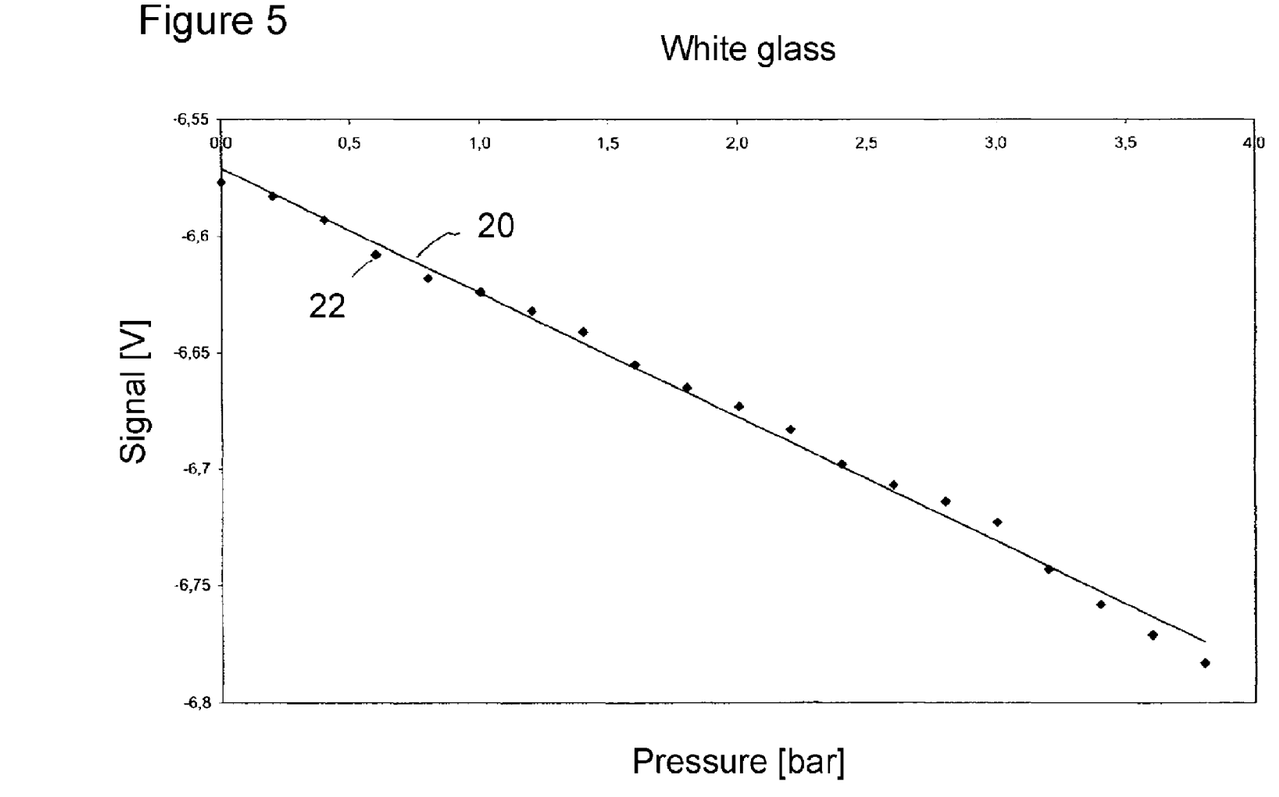
FIG. 5 shows a characteristic curve for the allocation of the accumulated intensity to the pressure value.

FIG. 5 shows the measurement results in a pressure range from 0 to 4 bar and the assigned signal values in volts for a photoelectric cell. One clearly recognises that the accumulated values follow a straight line 20 very well. The deviations of the values 22 from the straight line 20 lead to inaccuracies in the pressure measurement that lie in the range of 1/100 bar or less and are not relevant for an industrial utilisation.

With the method of the present invention, the absorption curve of the gas is no more measured with a spectrally tunable single-mode laser. According to the present invention, the pressure is determined directly via the entire transmission curve. According to the present invention, this permits a simpler, faster and more cost-saving pressure measurement using more compact sensors. The simplicity increases the potential for automatization at the same time. Besides to this, because changes of the transmission are particularly significant at higher pressures, the new method of the present invention permits higher measurement precision and a greater measurement range.

One advantageous embodiment of the present invention provides that the radiation source is a thermal radiator, which emits a Planck spectrum. These radiators are particularly cost-saving and simple to operate and according to the present invention, they permit a simpler, faster and more cost-saving pressure measurement. In addition, the absorption can be exploited on an entire (or several) absorption band(s), which excludes spectral detuning of the radiator, and thus increases the potential for automatization by the present invention.

According to another advantageous embodiment, an optical filter is inserted into the optical path for narrowing spectrally the thermal radiator. As the emission spectrum can be exactly tuned to the absorption of the absorbing component by doing so, this measure permits higher measurement precision.

Another embodiment provides that the radiation source is a LED. Its emission spectrum can be perfectly tuned to the absorption of the absorbing component. This measure permits higher measurement precision. Because LEDs are very small radiation sources, it permits particularly compact sensors in addition.

By its high spectral emission power, the utilisation of a laser as radiation source permits great signals which increase the measurement sensitivity. If it is dealt with a semiconductor laser in addition, this permits particularly compact sensors.

Another embodiment describes the utilisation of a modulated radiation source, combined with a frequency-selective radiation processing. This measure eliminates background signals and thus it increases the measurement sensitivity.

According to an embodiment, the reflection of the radiation after passing through the container and the repeated passage through the container permits an increase of the measurement sensitivity. The multiple reflection with further reflectors permits a further increase of the measurement sensitivity.

The automatization potential is increased in that the calibration is performed by a measurement of the radiation without container in the beam path. This is intended by one embodiment.

Figure 3:
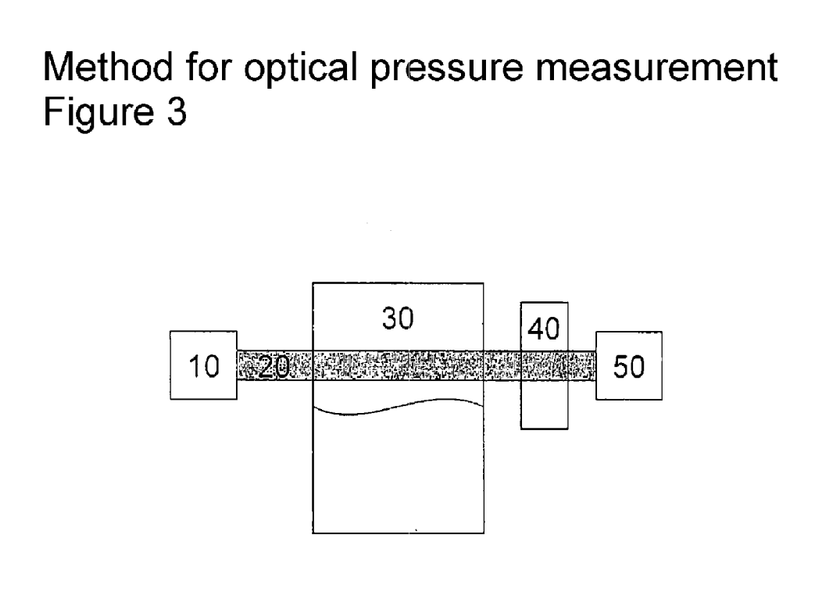
FIG. 3 shows a schematic depiction wherein the radiation is directed through a gas phase.

A first example of the realisation of the present invention is depicted in FIG. 3. It represents an utilisation of the present invention in the quality control of the production of sparkling wines. Champagne, German Sekt, German so-called Perlwein, Italian Prosecco etc. are produced using the in-bottle fermentation process. The biggest part of the carbon dioxide generated in the fermentation ($CO_2$) is dissolved in the liquid. But in part it is accumulated above the liquid, until an equilibrium with the dissolved $CO_2$ is established. Depending on the sort of sparkling wine, pressures between 2 bar and 6 bar arise through this. Measurement of the pressure yields information about the quality of the sparkling wine, and leaky bottle closures are recognised at the same time. This embodiment of the present invention serves for non-invasive online/inline determination of the $CO_2$ pressure in the closed bottle. For this purpose, the infrared radiation 20 of a thermal radiation source 10 (quartz tube radiator) is directed through that part of the neck of the corked bottle 30 of sparkling wine that is filled with gas. The leaving radiation passes through an interference bandpass filter 40, whose transmission is in the spectral range of 1.99 µm to 2.02 µm (for instance model BP-1982-87 nm of Spectrogen AB Company in Sweden). $CO_2$ absorbs very well in this wavelength range, and the differently coloured bottle glasses exhibit an acceptable transmission. The detection of the radiation is then performed with the aid of a photoelectric diode, an InGaAs photodiode for instance. The calibrated system determines the pressure from the transmission signal and the simultaneously measured temperature. This example of the realisation of the present invention can also be used for recording a fermentation curve of sparkling wine.

Figure 4:
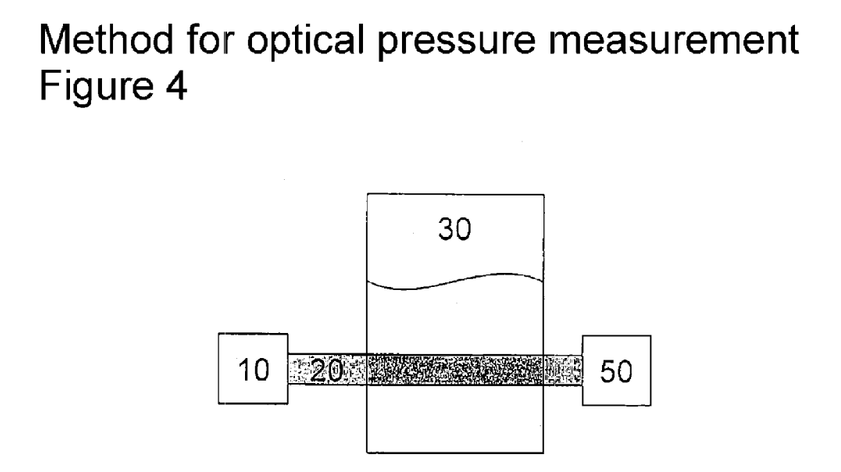
FIG. 4 shows a schematic depiction wherein the radiation is directed through a liquid phase.

A second realisation example of the present invention is depicted in FIG. 4. It shows an utilisation of the invention in the quality control of the production of mineral water, lemonade and mixed drinks. These beverages contain carbon dioxide in order to obtain a better refreshment effect when drinking them. The $CO_2$ is pumped under high pressure into the beverage. In this, about 0.2% of the $CO_2$ react with water to carbonic acid ($H_2CO_3$). However, the greatest part is dissolved in the water. After closing the beverage bottle, $CO_2$ accumulates above the liquid for so long until an equilibrium with the dissolved gas has been established. Pressures of several bar are generated in this, depending on the carbon dioxide content. Measurement of the $CO_2$ pressure in the liquid or of the $CO_2$ pressure above the liquid gives information about the quality of the drink and permits to detect leaky bottles at the same time. The invention serves for the non-invasive online/inline determination of the dissolved carbon dioxide in the closed bottle. For this purpose, the infrared radiation 20 of a thermal radiation source 10 is directed through that part of the beverage bottle 30 which is filled with liquid. That spectral range of the radiation is used for the measurement in which $CO_2$ has a good absorption and the differently coloured glass- and PET bottles have sufficient transmission. The detection of the radiation is then performed with the aid of a photodiode, an InGaAs-photodiode 50 e.g. From the transmission signal and the simultaneously measured temperature, the calibrated system determines the content of dissolved $CO_2$. This realisation example of the invention can also be used with a corresponding calibration for quality control of the production of beer, mixed beer drinks and alcopops.

Further realisation examples are:

A quartz tube radiator with a largely homogeneous surface temperature of about 700° C. is used as radiator.

Resulting from this, the main portion of the particularly powerful emission is in the wavelength range from 1.9 µm to 4 µm. An Indium-Gallium-Arsenide-photodiode is used as detector, which has good spectral sensitivity particularly in the long wavelength region from 1.4 µm to 2.2 µm. Taking into account that the absorption band of carbon dioxide is in the region from 1.9 µm to 2.1 µm, it becomes clear that optical pressure measurement is feasible with the aid of the quartz tube radiator and the Indium-Gallium-Arsenide-photodiode.

In a further realisation example, one or several LEDs are used as radiation sources. The provided LED emits radiation in the spectral range between 2.0 µm and 2.1 µm. Corresponding to this, an Indium-Gallium-Arsenide-photodiode can be used to receive the transmitted radiation. The light emitting diode can be used in the pulsed operation. When using LEDs, it has proven to be particularly advantageous to operate the same with stabilised temperature, in order to prevent fluctuations in the spectral emission.

This completes the description of the preferred and alternate embodiments of the invention. Those skilled in the art may recognize other equivalents to the specific embodiment described herein which equivalents are intended to be encompassed by the claims attached hereto.

The invention claimed is:

1. Method for optical pressure measurement of a gas in a closed container by directing a radiation of a radiator through the container and measuring the transmitted radiation by a detector, wherein:
   the radiation of the radiator covers at least one first wavelength range in which there is an absorption of the radiation by the gas,
   the intensity of the transmitted radiation is detected in a second wavelength range by the detector, wherein the second wavelength range overlaps at least partially with the first wavelength range, and
   an accumulated intensity of the detected radiation in the second wavelength range is assigned to a pressure of the gas.

2. The method according to claim 1, wherein the radiation is directed through the gas in the gas phase.

3. The method according to claim 1, wherein the radiation is directed through the gas which is dissolved in a liquid.

4. A method according to claim 1, wherein the radiator radiates with a continuous spectrum in the first wavelength range.

5. The method according to claim 4, wherein a thermal radiator is provided as radiator, whose radiated spectrum corresponds to a Planck spectrum.

6. A method according to claim 1, wherein at least one light emitting diode is provided as radiator.

7. A method according to claim 1, wherein a laser is provided as radiator, a semiconductor laser in particular, whose radiated wavelength is modulated in the first wavelength range.

8. A method according to claim 1, wherein the second wavelength range of the detector covers also the wavelengths of the first wavelength range, in which there is an absorption by the gas.

9. A method according to claim 1, wherein the first wavelength range of the radiator is limited to the second wavelength range by one or several filters.

10. A method according to claim 1, wherein the accumulated intensity in the second wavelength range corresponds to the intensity that is summed up or integrated over the second wavelength range.

11. A method according to claim 1, wherein the value of the accumulated intensity is assigned to a pressure value via at least one predetermined characteristic curve.

12. A method according to claim 1, wherein carbon dioxide is intended as gas.

13. The method according to claim 12, wherein the radiation is directed through a closed beverage bottle.

14. A method according to claim 1, wherein the radiation is directed through a container which is filled with a protective gas.

15. A method according to claim 1, wherein the radiation is directed through a vacuum closed container.

16. A method according to claim 1, wherein the allocation of the accumulated intensity to the pressure takes place depending on the transmission spectrum of the container.

17. Device for the optical pressure measurement of a gas in a closed container, said device including:
   a radiator, which generates a radiation in a first wavelength range, wherein there is an absorption of the radiation by the gas in the first wavelength range,
   a detector, which detects the intensity of the radiation transmitted through the container and the gas in a second wavelength range, wherein the second wavelength range overlaps at least partially with the first wavelength range, and
   with an analyzing unit, which assigns a pressure value to an intensity accumulated in the second wavelength range.

18. The device according to claim 17, wherein a thermal radiator is provided, whose radiated spectrum corresponds to a Planck spectrum.

19. The device according to claim 17, wherein one or several light emitting diodes with a continuous spectrum are provided.

20. The device according to claim 17, wherein a laser is provided as radiator, a semiconductor laser in particular, whose radiation can be modulated in the first wavelength range.

21. A device according to claim 17, wherein within the second wavelength range, the detector has several switchable measurement ranges, in which the pressure value is determined for different pressure ranges of the gas.

22. A device according to claim 17, wherein the analyzing unit has a characteristic curve, which assigns the pressure value to the accumulated intensity.

23. A device according to claim 17, wherein the analyzing unit has plural characteristic curves depending on the transmission spectrum of the container, each one assigning the pressure value to the accumulated intensity.

* * * * *